(No Model.)
B. F. MUSCHERT.
PARIS GREEN AND FERTILIZER DISTRIBUTER.
No. 266,186. Patented Oct. 17, 1882.
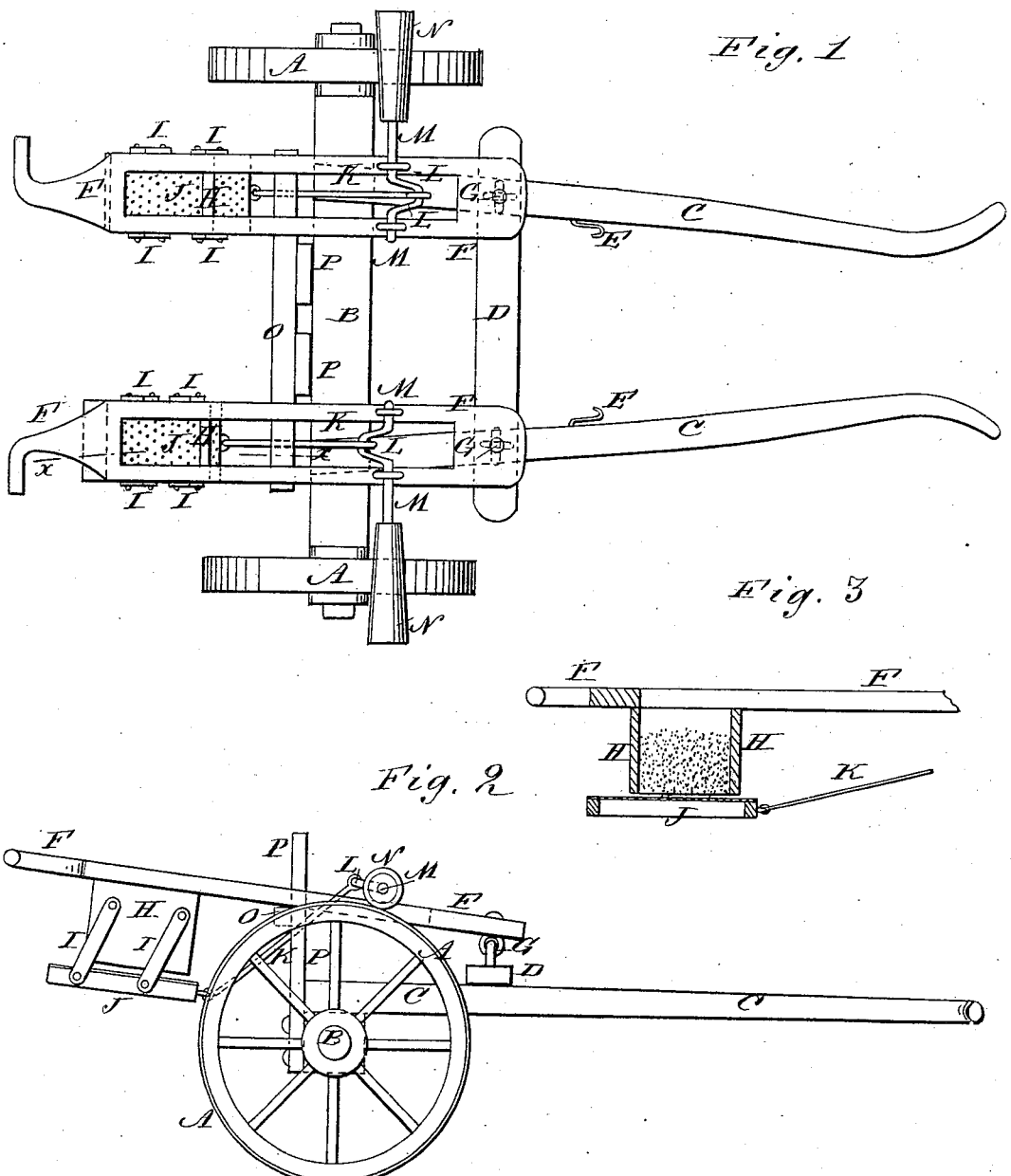
WITNESSES: 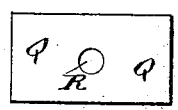 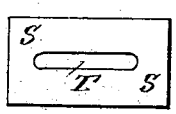 INVENTOR:
C. Neveux  B. F. Muschert
C. Sedgwick BY Munn & Co
ATTORNEYS.

UNITED STATES PATENT OFFICE.

BENJAMIN F. MUSCHERT, OF MORRISVILLE, PENNSYLVANIA.

PARIS-GREEN AND FERTILIZER DISTRIBUTER.

SPECIFICATION forming part of Letters Patent No. 266,186, dated October 17, 1882.

Application filed April 22, 1882. (No model.)

*To all whom it may concern:*

Be it known that I, BENJAMIN FRANKLIN MUSCHERT, of Morrisville, in the county of Bucks and State of Pennsylvania, have invented a new and useful Improvement in Paris-Green and Fertilizer Distributers, of which the following is a full, clear, and exact description.

Reference is to be had to the accompanying drawings, forming a part of this specification, in which similar letters of reference indicate corresponding parts in all the figures.

Figure 1 is a plan view of my improvement. Fig. 2 is a side elevation of the same. Fig. 3 is a sectional side elevation of a part of the same, taken through the line $xx$, Fig. 1. Figs. 4 and 5 are plan views of slides for regulating the amount of paris-green or fertilizer distributed.

The object of this invention is to facilitate the distribution of paris-green and fine fertilizers and promote convenience in depositing the same upon crooked rows and irregular hills.

The invention consists in the special construction, arrangement, and combination of parts, all as hereinafter fully described and claimed.

A are the wheels of the axle B, to which axle are rigidly attached thills C. The thills C are connected at a little distance from the axle B by a cross-bar, D, and are provided with hooks E for the attachment of the draft.

To the end parts of the cross-bar D, or to the thills C, are hinged the forward ends of the bars F, by eyebolts G, or other suitable means that will allow the rear ends of the said bars to have a free vertical and lateral movement.

The hinged bars F have wide longitudinal slots formed in them, and to their lower sides at the rear ends of the said slots are attached boxes H to receive the paris-green or fine fertilizer to be distributed. The sides and ends of the boxes H may be vertical, as shown in Fig. 3, or the lower parts of the sides and ends of the said boxes may be inclined inward or made hopper-shaped.

To the sides of the boxes H are pivoted the upper ends of short bars I, the lower ends of which are pivoted to the side bars of the frames of the screens J. The screens J are made of perforated sheet metal, wire-gauze, or other suitable material, and to the forward end of their frames are pivoted the rear ends of connecting-rods K, the forward ends of which are pivoted to cranks L, formed upon the short crank-shafts M. The crank-shafts M work in bearings attached to the bars F at a little distance from the forward ends of their slots, so that the cranks L can revolve in the said slots.

The outer parts of the crank-shafts M project across the faces of the wheels A, and have rubber rollers N attached to them, which rest upon the faces of the said wheels A, so as to revolve by friction to vibrate the screens J, and thus shake out the paris-green or fertilizer. The rubber rollers N are made long, so that the rear ends of the bars F can be moved laterally without withdrawing the said rollers from contact with the wheels A.

The middle parts of the slotted bars F rest upon the projecting ends of a cross-bar, O, the middle part of which is attached to the uprights P.

The lower ends of the uprights P are attached to the rear side of the axle B, and their upper ends project above the cross-bar O, and are so formed that the slotted bars F can be hung upon them to hold the rollers N out of contact with the wheels A when the machine is to be turned around or taken from place to place. With this construction the bars F and their attachments can be readily moved laterally to follow crooked rows or to sprinkle irregular hills.

When the plants are very small and only a small quantity of paris-green or fertilizer is required to be sprinkled upon them, slides Q, with a round hole, R, in their centers for the escape of the paris-green or fertilizer, can be placed upon the screens J. As the plants become larger and require to have more of the paris-green or fertilizer sprinkled upon them the slides Q can be removed and replaced with the slides S, which have slots T formed through them. As the plants become still larger the screens J can be used without any slides.

The machine can be adjusted for the distribution of any desired material by varying the size and arrangement of the apertures in the slides and screens.

Having thus described my invention, I claim as new and desire to secure by Letters Patent—

1. A paris-green and fertilizer distributer constructed substantially as herein shown and described, and consisting of the carriage A B C, the pivoted slotted bars F, carrying boxes H, the suspended screens J, and the connecting-rods K, crank-shafts M, and friction-rollers N, as set forth.

2. In a paris-green or fertilizer distributer, the combination, with the carriage A B C, of the pivoted bars F, carrying the boxes H, the vibrating suspended screens J, and the connecting-rods K, crank-shafts M, and friction-rollers N, substantially as herein shown and described, whereby the said bars can be moved laterally to follow crooked and irregular rows, and vertically to throw the operating mechanism out of and into gear, as set forth.

3. In a paris-green and fertilizer distributer, the combination, with the axle B and the pivoted bars F, carrying the boxes H, of the cross-bar O and the uprights P, substantially as herein shown and described, whereby the pivoted bars F and their attachments are supported, as set forth.

BENJAMIN FRANKLIN MUSCHERT.

Witnesses:
HENRY D. SCUDDER,
R. RUHLMAN.